United States Patent [19]
Reforzo

[11] 3,711,757
[45] Jan. 16, 1973

[54] AUTOMATIC SERVO SYSTEM FOR ELECTRIC CABLE MARKING MACHINES

[75] Inventor: Jean Baptiste Marie Reforzo, Marseille, France

[73] Assignee: Societe Nationale Industrielle Aerospatiale, Paris, Seine, France

[22] Filed: Jan. 15, 1971

[21] Appl. No.: 106,870

[30] Foreign Application Priority Data

Jan. 19, 1970 France..................7001775

[52] U.S. Cl.....................318/600, 101/37
[51] Int. Cl..............................G05b 19/26
[58] Field of Search.........318/142, 600, 601; 101/37

[56] References Cited

UNITED STATES PATENTS

| | | | |
|---|---|---|---|
| 3,181,403 | 5/1965 | Sterns et al. | 318/600 X |
| 2,692,361 | 10/1954 | Asbury et al. | 318/142 |
| 3,048,751 | 8/1962 | Taylor | 318/601 X |
| 3,195,385 | 7/1965 | Patterson | 318/600 X |

Primary Examiner—T. E. Lynch
Attorney—Waters, Roditi, Schwartz & Nissen

[57] ABSTRACT

An automatic servo system for marking machines, comprising cable run measuring means positioned upstream of a marking machine, cable cutting means positioned downstream thereof, and an electronic unit for generating marking control signals, for changing the pitch of the marking and for cutting the cable, said unit being controlled by the cable run measuring means.

7 Claims, 8 Drawing Figures

AUTOMATIC SERVO SYSTEM FOR ELECTRIC CABLE MARKING MACHINES

The present invention relates to an automatic servo system for electric cable marking machines and more particularly for cables used in electrical systems on board aircraft.

Certain aeronautical industry standards require that the cables or electrical conductors used in such installations be identified by direct markings on their covering according to the function of the circuit to which they belong and by sections along that circuit. These standards specify a marking code which is used by design offices when preparing wiring diagrams. The application of such standards offers undeniable advantages for eliminating errors in the connections to the various components in an installation, and observing these standards during the quantity production of electric cable harnesses imposes a cable or conductor marking phase applicable to all the harnesses.

The currently manufactured machines used for this purpose are generally of the manually or semi-automatically controlled type. They allow the cables to be marked on a "one shot" basis or continuously, but in the latter case changes in the pitch of the markings usually have to be commanded. Such changes of pitch enable smaller intervals to be obtained between the identification or other marks at the cable ends in order to facilitate the reading of the marks over the connection areas, while a wider pitch over the middle portion of the cable will enable the latter to be run through the machine faster and furthermore means a saving in ribbon in the case of machines utilizing a marking ribbon.

Further, such machines do not cut the cables, nor coil them into sets of identically-marked cut cables, and this work requires the presence of an operative throughout operation of the machine.

It is, among other things, the object of this invention to overcome these drawbacks and to permit the marking of series of cables with an automatic change of pitch, automatic cutting of the cables to preprogrammed running lengths, and grouped coiling up of identically marked cables of equal length with automatic stopping of the machine upon completion, the only manual operations required being to preset the number and length of cables to be processed.

It is accordingly the object of the present invention to provide an automatic servo system for electric cable marking machines of the kind comprising cable transfer means, marking means, control means of the aforesaid means and means for controlling changes of pitch in the markings by varying the relative pace of the cable transfer means and the marking means.

A system according to this invention is characterized by the fact that it includes cable run measuring means positioned upstream of the marking machine, cable cutting means positioned downstream thereof, and an electronic unit for generating signals for controlling the marking, the changes in the pitch of the markings and the cutting of the cable, said unit being controlled by the cable run measuring means and comprising series-connected decade units for in-parallel control of binary-decimal converters the outputs of which are connected to switches the positions of whose cursors represent a presetting of the length to be imparted to each cable, means for automatically activating a system that shunts the cable transfer control means of the marking machine, means for activating the pitch change control means after a predetermined length of cable has run through, and means for releasing such control means at a different predetermined cable length short of the full preset length of cable which is run through, cable cutting control means activated from the set of switch cursors when the measured length reaches the preset length and means for zeroing the decade units responsively to operation of the cable cutting means.

The system according to this invention is consequently adaptable to all marking machines which comprise or are capable of receiving a cable transfer and marking servo control device.

It is to be noted that the signals which control cable marking, marking pitch and cutting are generated according to the preset inputs and are slaved to the cable run. Changes of pitch can be programmed automatically according to the cable length. If necessary, however, the automatic pitch change circuit can be rendered inoperative in order to obtain constant small-pitch marking.

The description which follows with reference to the accompanying non-limitative exemplary drawings will give a clear understanding of how the invention can be carried into practice.

FIGS. 3 to 6 jointly represent, following a juxtaposition whereby conductors bearing the same reference letter $a$ to $z$ and $a'$ to $l'$, are fetched into registry, the electrical circuit diagram of the programming and signal generating unit for controlling the system;

And FIGS. 7 and 8 illustrate the manner of operation of the system in its initial and final stages.

Figure 1:
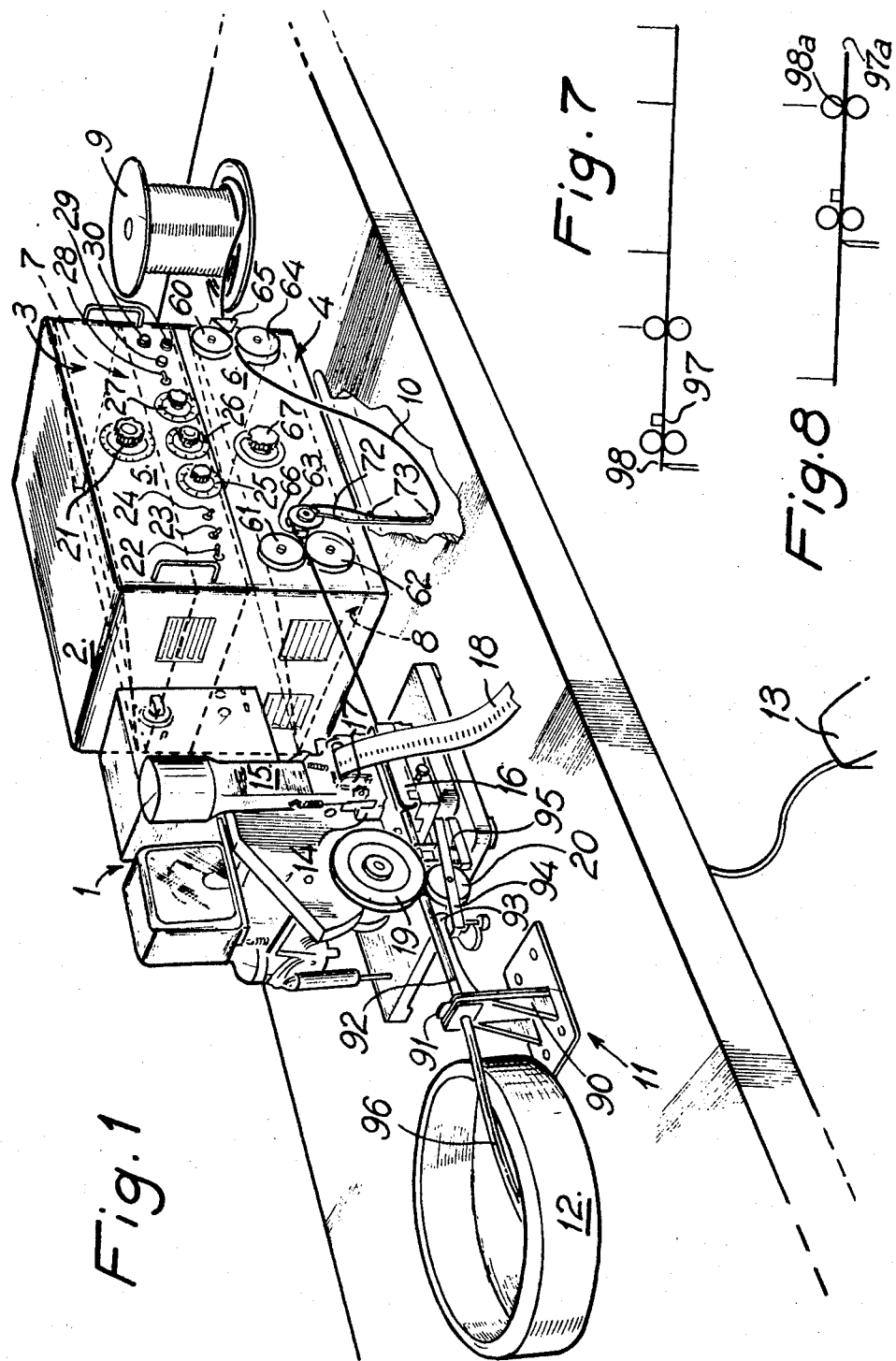
FIG. 1 is a perspective showing of an installation which includes a marking machine and a servo system according to this invention.

The system illustrated in FIG. 1 is composed of a cable marking machine 1, a metal cabinet 2 having two slide-in units 3 and 4 each comprising a vertical front panel 5 (or 6) and a horizontal plate 7 (or 8) within the cabinet and on which are respectively mounted an electronic circuitry type programming and control signal generating unit and a cable feed and cable run measuring unit, a spool 9 carrying cable 10, a cable cutting unit 11, a coiling unit 12 and a stepwise cable transfer pedal 13.

The marking machine 1 may be a machine which printmarks and which includes a heated marker-holder 14 which receives a mark-setter and is actuated by a pneumatic jack 15, a cable guide 16 positioned beneath the marker, a roll 17 for supplying a printing ribbon 18 and driven by the marker-holder, the ribbon being fetched into contact with the cable, and two pulleys at the exit end of the cable guide, of which one pulley 19 is driven by a motor and the other pulley 20 is loosely mounted, the two together causing the cable to advance by gripping it between them.

As shown in FIG. 1, the front panel 5 of slide-in unit 3 mounts a knob 21 for setting the number of cables to be processed (graduated for example from 1 to 24), a changeover switch 22 which renders the circuits of the programming and control signal generating unit operative either for a "First cable test" sequence or for an "Automatic" sequence, a switch 23 which controls the circuits of said unit either for "Fine pitch" marking or for "Fine pitch + coarse pitch" marking, the role of this switch being to neutralize the automatic pitch change function in cases where fine pitch marking is required on long cable lengths, an "On-Hold" switch 24 for momentarily arresting the marking (the length of cable already marked being memorized), three knobs 25, 26 and 27 for respectively setting the decameters, meters and decimeters of length to be imparted to each cable, graduated respectively from 0 to 9, an "On-Off" switch 28, a "Voltage present" indicator light 29 and two protective fuse cartridges 30.

Figure 3:
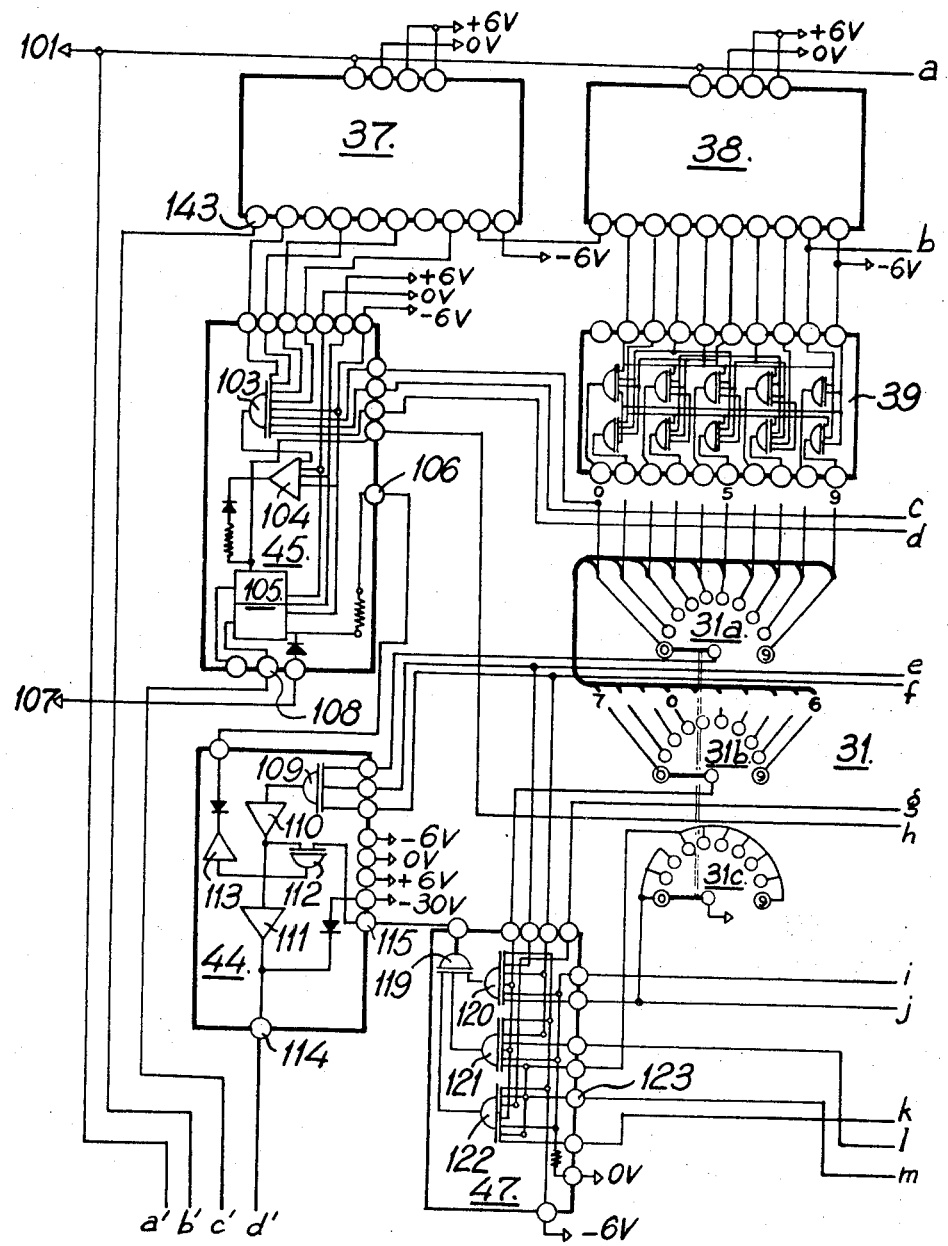
Figure 4:
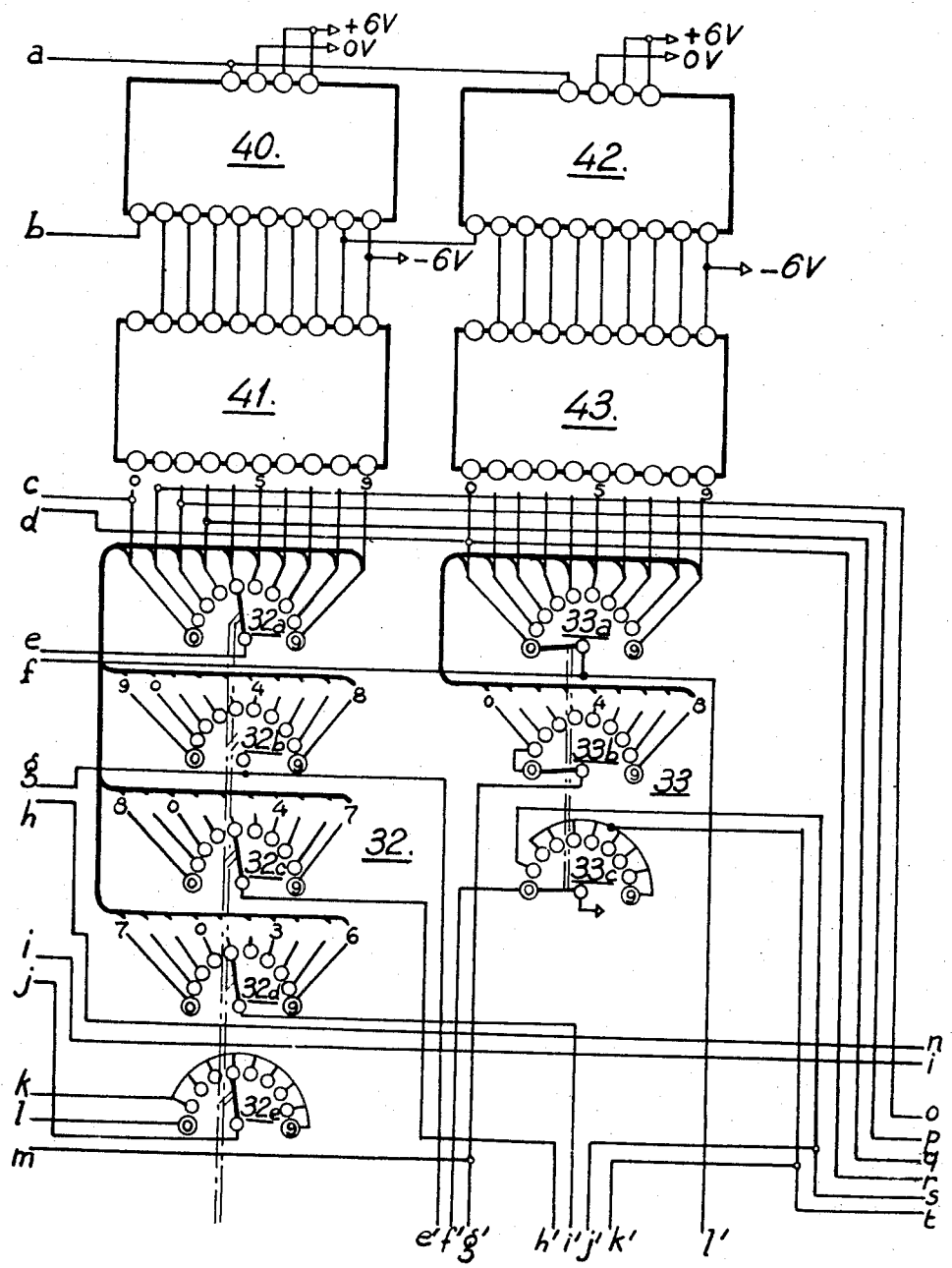
Figure 5:
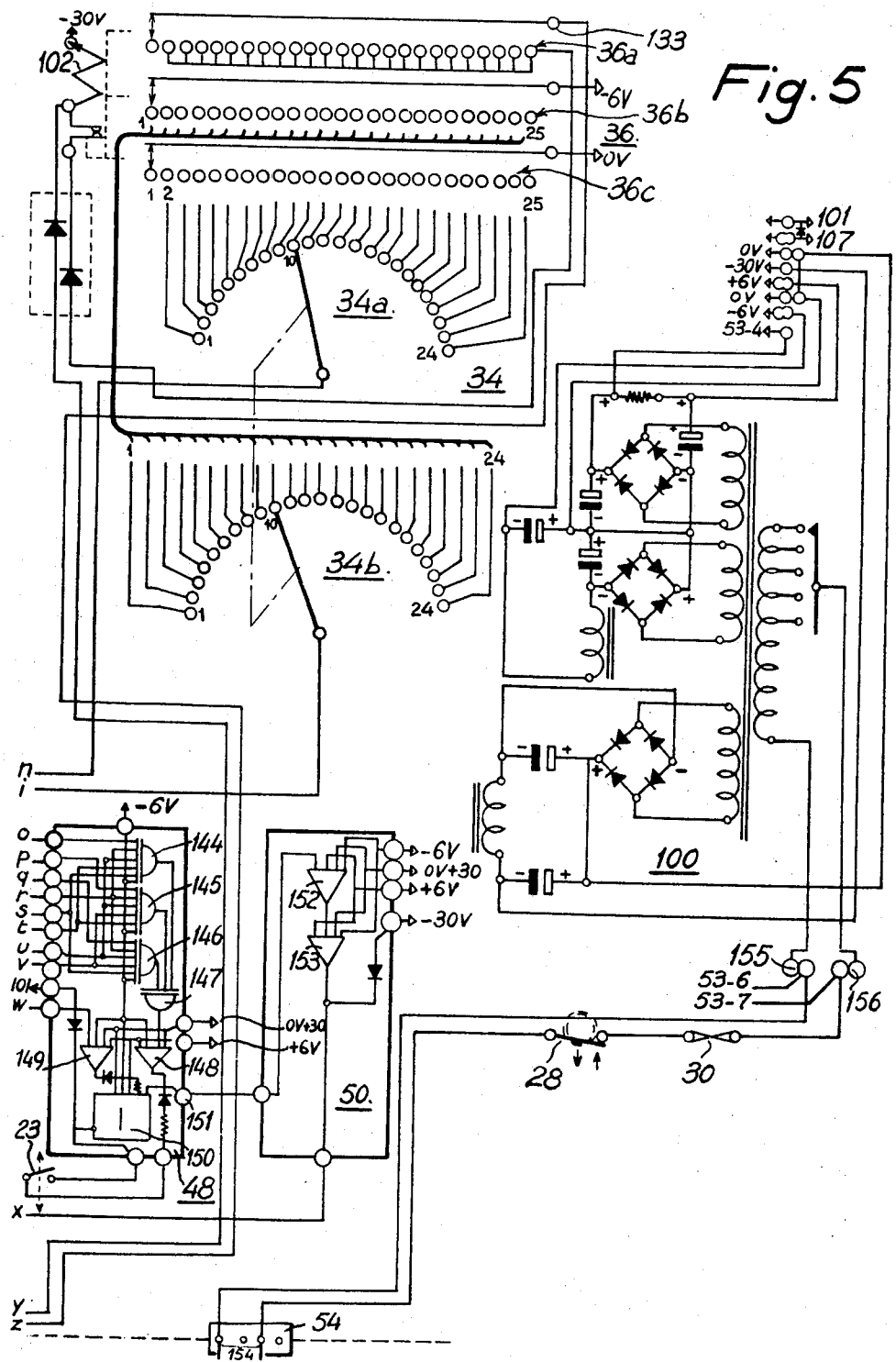

Carried on the inside face of panel 5 are four rotary switches 31, 32, 33 and 34 connected respectively to knobs 21, 25, 26 and 27 (FIGS. 3, 4 and 5).

Upon and beneath plate 7 of the same slide-in unit 3 are mounted a stop relay 35 (FIG. 6), a stepwise selector 36 (FIG. 5) which registers the number of cables cut and marked, a plug-in support for receiving fifteen wired modules 37 through 51 which carry the electronic components for performing the functional sequences of the programming and control signal generating unit, and wiring for interconnecting the abovespecified elements and for connecting them to quick-disconnect connectors 52, 53 and 54 (FIGS. 5 and 6) mounted at the rear of the slide-in unit and enabling this circuitry to be connected to a cutting-jack electrically-operated valve 55, to a pedal current outlet 56, to the pedal 13, to an electrically-operated pitch change distributor 57 which operates on the relative rates of pulley 19 and jack 15 and to a cable cutting microswitch 58 in the case of connector 52, to the cable supply and cable run measuring unit 59 in the case of connector 53 and to the mains in the case of connector 54. The power supply for the complete unit is also contained in this slide-in unit.

As shown in FIG. 1, the outer face of panel 6 of slide-in unit 4 mounts five pulleys 60 through 64 and two cable-guides 65 and 66. The two pulleys 60 and 61 are cable-guiding pulleys located at either end of the slide-in unit, the former on the side of spool 9 and the latter on the side of machine 1; they can be raised by means of a central knob 67 which through the agency of its spindle and cams 68 carried thereon, acts upon the ends of two levers 69 which are placed on the other side of the panel and fulcrumed about pins 70 and carry on their other ends the hub axles of the two pulleys, these levers being urged back into position by springs 71 fastened to plate 8. Pulley 62 is positioned below pulley 61 and is tangential thereto when the latter is in its bottom position, pulley 62 being used to measure the cable run and having its diameter determined accordingly. Pulley 63 is a grooved pulley loosely mounted on its axle and positioned upstream of pulleys 61 and 62 and its purpose is to facilitate cable transfer responsively to pulling forces from the marking machine. Mounted along a radial axis of the pulley 63 and fast with the axle thereof is a feed stick 72 which in its resting position is vertical and comprises along its length two rings 73 through which the cable passes before running over pulley 66, and this stick pivots toward pulley 60 when the machine exerts pulling forces. Pulley 64 is a pulley with an anti-slip coating which is positioned below pulley 60 and which is tangential thereto when the latter is in its bottom position; this pulley is used for paying out the cable. The two cable-guides 65 and 66 ensure that the cable runs correctly through the pulley systems 60–64 and 61–62 and are positioned at the entries thereinto respectively.

Figure 2:
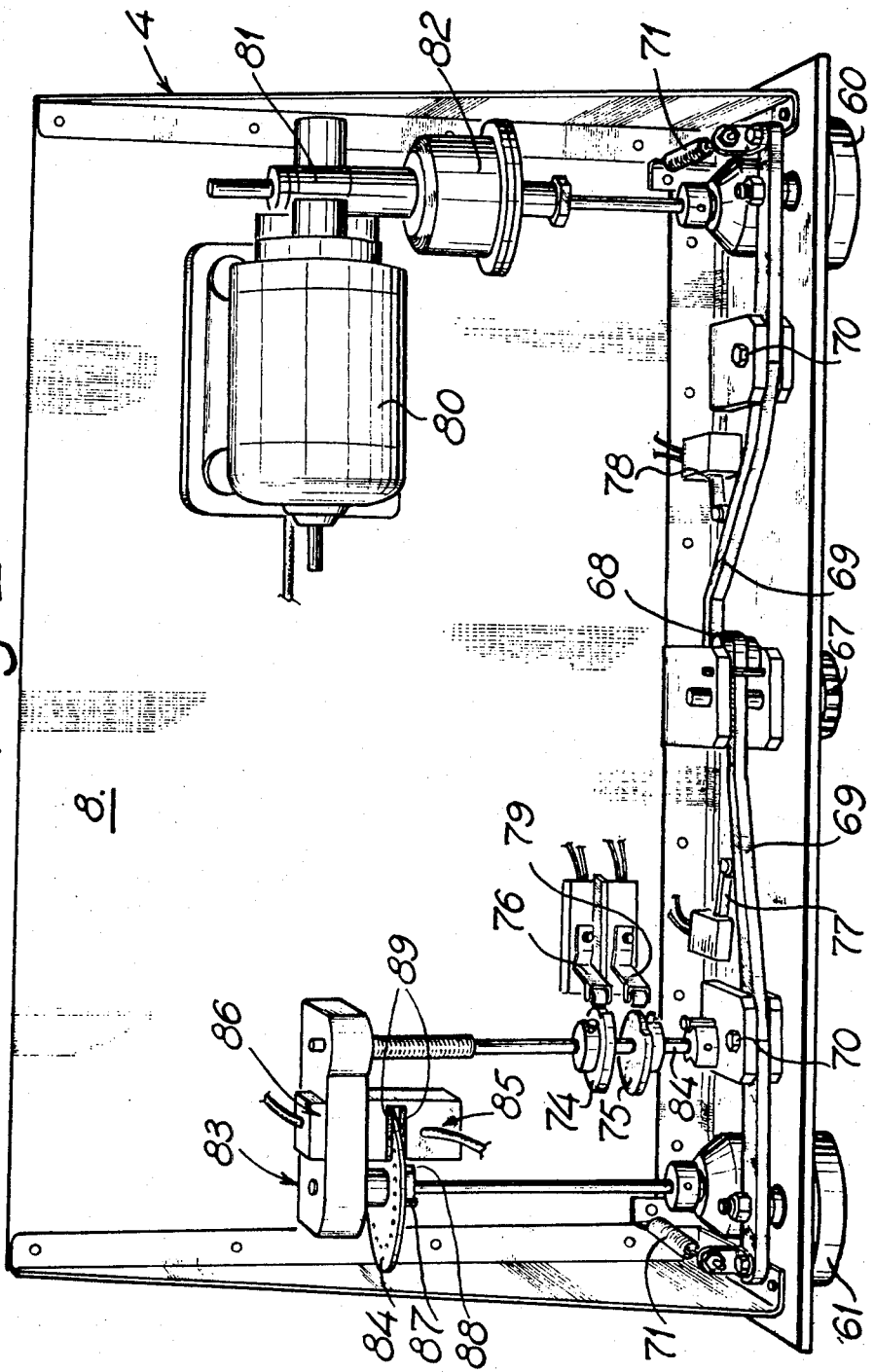
FIG. 2 illustrates the cable run measuring means of the servo control system and means for supplying cable thereto.

As shown in FIG. 2, slide-in unit 4 contains, in addition to the cams 68, the levers 69 and the springs 71, two cams 74 and 75, four microswitches 76 through 79, a motor 80 which drives pulley 64 through the agency of reduction gearing 81 and a friction-type torque limiter 82, and a cable run transducer 83. The two cams 74 and 75 are fast with the rotation axle 84 of stick 72 and their lobes are offset in relation to the vertical position of said stick. The lobe on cam 74 is offset by 30° and actuates the first microswitch 76 to energize motor 80 after the stick 72 has pivoted through 30° relative to its vertical resting position. Thus when the marking machine exerts a normal pull on the cable, stick 72 pivots; if the cable is restrained by pulleys 60 and 64, the motor 80 is energized and drives pulley 64 to cause the cable to advance. Further, microswitches 77 and 78 are actuated by the levers 69 to arrest operation of the system when pulleys 60 and 61 have been raised, thereby to facilitate engagement of the cable through the stick rings 73 without placing a load on the feed motor 80. The lobe on cam 75 is offset by 75° and actuates the fourth microswitch 79 which is series-connected to microswitches 77 and 78 in such a way as to cause it to cut off the electric power to the marking machine and the motor 80 when the stick is tilted at 75° to its vertical resting position. This latter arrangement constitutes a safeguard to prevent damage to the conductors in the event of accidental jamming of the cable during the marking process. Transducer 83 is formed by a circularly perforated disc 84 which interposes itself between a light source 85 and a photodiode 86. The transition from a perforation to a solid area corresponds to 1 centimeter of cable rum over pulley 62, whereby the measuring signals are picked up to within 1 centimeter. Disc 84 is fast with the axle of pulley 62, though with a degree of angular play, through the agency of a peg 87 and a stop 88, and between disc 84 and the housing of light source 85 and also between the disc and the housing of photodiode 86 are positioned fixed expanses of felt 89 which rub against the disc and into which are let suitable openings to allow the light beam to pass through. The purpose of this arrangement is to prevent return motion of the disc in the direction opposite to the normal direction of travel of the cable during movements of the stick (which would produce errors of measurement) and also to prevent stray light rays from penetrating into the optical unit.

The cable cutting unit 11 comprises a guillotine-type knife 90 actuated by a pneumatic jack which is itself activated by the valve 55 (FIG. 6) controlled by the electronic circuitry in the programming and control signal generating unit. The movable knife blade 91 is rigid with an inlet cable-guide tube 92 carrying a pusher 93 which, as soon as the cutting phase is initiated, bears upon an arm 94 carrying pulley 20 in a direction tending to move it away from pulley 19 against countering return springs 95 whereby to release the cable drive. The knife exit cable-guide tube, which is fast with the fixed portion of the guillotine, extends into the open top of a vertical-axis cylindrical receiving drum 12 for coiling the cable by feeding in the latter tangentially to the side wall of the drum. By reason, inter alia, of the shape of the receiving drum, this arrangement, which is well known per se, permits automatic grouped coilings of the sets of identically marked cables of equal length.

The electronic circuitry type programming and control signal generating unit illustrated by FIGS. 3 to 6 basically comprises the five modules 37 to 51, the four rotary switches 31 to 34, the stepwise selector 36 and a main power supply strip 100 (FIG. 5).

Modules 37, 38, 40 and 42 carry four decade units for the centimeters, decimeters, meters and decameters respectively, each unit having fourteen terminals of which one is connected to a decade zeroing means 101, one to the 0 V voltage, two to the +6 V voltage and one to the −6 V voltage, and each of the first three decade units has one terminal connected to another terminal of the next decade unit whereby to interconnect the four units in series.

Modules 39, 41 and 43 respectively carry three binary-decimal converters parallel-connected respectively to the decade-units 38, 40 and 42 by sets of nine input terminals for each converter that are connected to nine output terminals for each decade unit (including the −6 V terminal and, in respect of units 38 and 40, the terminal connected to the next decade unit).

Stepwise selector 36 comprises an actuating solenoid 102 and three banks of 25 contacts each 36a, 36b and 36c associated respectively to three lines the last two of which are at −6 V and 0 V respectively.

Of rotary selectors 31, 32, 33 and 34, the first and the third each have three switching surfaces 31a, 31b, 31c and 33a, 33b, 33c of 10 studs each, the second has seven switching surfaces 32a through 32g of 10 studs each, and the fourth has two switching surfaces 34a and 34b of 24 studs each. The 10 studs 0 through 9 of each of contact surfaces 31a, 32a and 33a are connected respectively via three 10-wire rakes to 10 output terminals 0 through 9 of converters 39, 41 and 43, and this without any stagger. Similarly, the 10 studs 0 through 9 of each of contact surfaces 31b, 32b, 32c, 32d and 33b are likewise connected by means of 10-wire rakes to the 10 output terminals 0 through 9 respectively of converter 39 in the case of contact surface 31b, of converter 41 in the case of contact surfaces 32b, 32c and 32d and of converter 43 in the case of contact surface 33b, but here the interconnections are staggered to the extent of one position in the case of contact surfaces 32b and 33b, i.e. from 1 to 0 through 9 to 8 and furthermore from 0 to 9 in the case of contact surface 32b (with studs 0 and 1 of contact surface 33b being interconnected), staggered by two positions in the case of contact surface 32c, i.e. from 0 to 8 through 9 to 7, and staggered by three positions in the case of contact surfaces 31b and 32d, i.e. from 0 to 7 through 9 to 6. Likewise, separately interconnected are the sets of studs 0 through 2 and 3 through 9 of contact surface 31c, 1 through 9 of contact surface 32e, 0 through 2 and 3 through 9 of contact surface 32f, 3 through 9 of contact surface 32g and 2 through 9 of contact surface 33c. Lastly, the 24 studs of the two contact surfaces 34a and 34b are connected by two 24-wire rakes respectively to contacts 2 through 25 of bank 36c of selector 36 and to contacts 1 through 24 of bank 36b of selector 36.

Of connectors 52, 53 and 54, the first two have nine terminals and the third four terminals.

Module 45 (FIG. 3) includes a negative gate 103, an amplifier 104 and a flip-flop 105, and 15 terminals of which seven are used to connect the input of gate 103 respectively to four terminals of decade unit 37 and to each of the output terminals 0 of converters 39, 41 and 43, three others for respectively placing the input of amplifier 104 and the first energizing means of flip-flop 105 at 0 V, the input of amplifier 104 and flip-flop 105 as a whole at +6 V, and the input of gate 103, the input of amplifier 104 and the second energizing means of flip-flop 105 at −6 V, another for connecting the first DC input on the base of flip-flop 105 (which input is further connected to the output of amplifier 104 via a resistor and a diode) to the cursor of contact surface 34b of selector 34, another to connect via a diode the second dc input on the base of flip-flop 105 (which input is likewise connected via a resistor to a further terminal 106 connected to module 44) to master zeroing means 107, and another one 108 to connect the second collector of flip-flop 105 to module 46. The output from gate 103 is furthermore connected to the input of amplifier 104.

Module 44 (FIG. 3) comprises a negative gate 109, two series-connected amplifiers 110 and 111, another gate 112 and another amplifier 113, and ten terminals of which three are used to connect the input of gate 109 to the three cursors of contact surfaces 31a, 32a and 33a respectively, another to connect terminal 106 of module 45 to the output of amplifier 113 via a non-return diode, another to place at −30 V (via a non-return diode) the output of amplifier 111 which is additionally connected directly, through another terminal 114, on the one hand via terminal 1 of connector 52 to the coil of electrically operated valve 55 and on the other via a non-return diode to one end of the solenoid 102 of selector 36 the other end of which is placed at −30 V, and another (115) to connect module 47 to the input of gate 112. The output of gate 109 is further connected to the input of amplifier 110, the output thereof to an input of gate 112, and the output from the latter to the input of amplifier 113.

Module 46 (FIG. 6) has two amplifiers 116 and 117 connected in series and six terminals, of which one is used to connect terminal 108 of module 45 to the input of amplifier 116, another three to place the inputs of the two amplifiers at −6 V, 0 V and +6 V respectively, and another to place the output of amplifier 117 at −30 V (via a non-return diode), which output is furthermore connected directly by means of a final terminal 118 to relay 35.

Module 47 (FIG. 3) has a positive gate 119 and three negative gates 120, 121 and 122, and thirteen terminals of which one is used to connect terminal 115 of module 44 to the output of gate 119, another to connect the cursor of switching surface 31b to an input of each of gates 120, 121 and 122, another to connect the cursor of switching surface 32a to an input of gate 120, another to connect the cursor of switching surface 33a to an input of each of gates 120 and 121, another to connect the cursor of switching surface 32b to an input of gate 122, another to connect the cursor of switching surface 34b to an input of each of gates 120, 121 and 122 which, via a resistor, are placed by means of another terminal at 0 V, another to connect studs 0 through 2 of switching surface 31c and the cursor of switching surface 32e to an input of gate 120, another to connect stud 0 of switching surface 32e to an input of gate 121, another to connect studs 3 through 9 of switching surface 31c to an input of each of gates 121 and 122, which gates are further connected by another terminal 123 to the cursor of switching surface 33b and to module 49, another to connect studs 1 through 9 of switching surface 32e to an input of gate 122, and the last one to place inputs of gates 120, 121 and 122 at −6 V. In addition, the outputs of these three gates are connected to the input of gate 119.

The stopping and drive engaging relay 35 includes a coil 124 which is connected between a contact of changeover switch 22 (via a diode) and terminal 118 of module 46 (via a resistor). It has two contacts, of which one, the contact 125, allows, via terminals 5 and 6 of connector 52, of making or breaking the circuit of pedal 13 (which circuit is further connected to the line supply connector 56), while the other contact 126 allows of simultaneously placing at −30 V, via a capacitor 127, either a terminal 128 (when contact 125 is in the circuit making position), or a contact 129 which is connected to coil 124 (on the side of terminal 118).

In its "Hold" position, changeover switch 24 closes a circuit between contact 129 of relay 35 and the contact 128 thereof via a resistor which is place at −30 V.

Changeover switch 22 has three sets of contacts 130, 131 and 132 which respectively place, in the "Automatic" position, coil 124 relay 35 at −30 V, and, in the "First cable test" position, place at +6 V firstly the main zeroing means 107, secondly (via a diode) the decades zeroing means 101, and thirdly (via a terminal 8 of connector 52) the cable cutting microswitch 58 (the other contact of which is placed at +6 V via a terminal 9 of connector 52), and at 0 V the line 133 associated to bank 36a of selector 36.

Module 49 (FIG. 6) has six negative gates 134 through 139, a positive gate 140, and fourteen terminals of which four are used to separately connect stud 0, stud 1, stud 2 and studs 3 through 9 of switching surface 32g respectively to inputs of gates 137, 138 and 139, to inputs of gates 134, 138 and 139, to inputs of gates 134, 135 and 139, and to inputs of gates 134, 135 and 136, another eight to respectively connect terminal 123 of module 47 and the cursor of switching surface 33b to inputs of the three gates 134, 135 and 136, the cursors of switching surfaces 32b, 32c and 32d separately to inputs of the gate pairs 134-137, 135-138 and 136-139, studs 3 through 9 of switching surface 32f, stud 1 and studs 2 through 9 of switching surface 33c respectively to inputs of the gate groups 135-138-136-MS( KMN-137-136-139 and 134-137-135-138 and the cursor of switching surface 33a to inputs of gates 137, 138 and 139, another terminal 141 to connect the output of gate 140 to module 48, the last terminal being placed at −6 V. Further, the outputs of gates 134 through 139 are connected to inputs of gate 140.

Module 51 (FIG. 6) comprises a Schmidt trigger circuit 142, plus terminals of which one connects trigger circuit 142 to a further terminal 143 of decade unit 37.

Module 48 (FIG 5) includes three negative gates 144, 145 and 146, a positive gate 147, two amplifiers 148 and 149, a bistable multivibrator 150, and sixteen terminals of which eleven respectively connect terminal 141 of module 49 to the input of amplifier 149, the decade zeroing means 101 via a diode to a first DC input on the base of multivibrator 150 and via another terminal to a contact of switch 23, terminals 3 through 9 and terminals 0 through 2 of switching surface 32f and terminals 2 through 9 and terminal 1 of switching surface 33c to inputs of gates 145, 146, gates 144, 145, 146, gates 144, 145 and gates 144, 146 respectively, the output terminal O of converter 43 to inputs of gates 144, 145, 146 and, separately, the output terminals 1, 2, 3 of converter 41 to an input of each of the same gates respectively, and the eleventh to connect the output of amplifier 148 via a non-return diode and a resistor to the other contact of switch 23, another three respectively placing at 0 V +30 the inputs of amplifiers 148 and 149 and the first supply input of bistable multivibrator 150, at +6 V the inputs of the two amplifiers and the second supply input of bistable multivibrator 150, and at −6 V the inputs of said amplifiers, inputs of gates 144 through 146 and bistable multivibrator 150 as a whole, the final terminal 151 being used to connect the second collector of multivibrator 150 to module 50. Further, the output of amplifier 149 is connected via a non-return diode and a resistor to the second DC input on the base of bistable multivibrator 150, the outputs of gates 144 through 146 to the input of gate 147, and the output from the latter to the input of amplifier 148.

Switch 23 opens or closes the circuit of the two terminals of module 48 (to which it is connected), depending on whether it is in the "Fine pitch" or "Fine pitch + coarse pitch" position.

Module 50 (FIG. 5) has two amplifiers 152 and 153 connected in series, and six terminals of which one connects terminal 151 of module 48 to the input of amplifier 152, three others simultaneously place at −6 V, 0 V +30 and 30 6 V respectively the two inputs of the two amplifiers, another places the output of amplifier 153 at −30 V via a non-return diode, the sixth terminal being used to connect the output of amplifier 153 directly, via terminal 7 of connector 52, to the coil of the electrically operated pitch-change distributor 57 the other end of which coil is placed at −30 V via a terminal 4 of connector 52.

Figure 6:
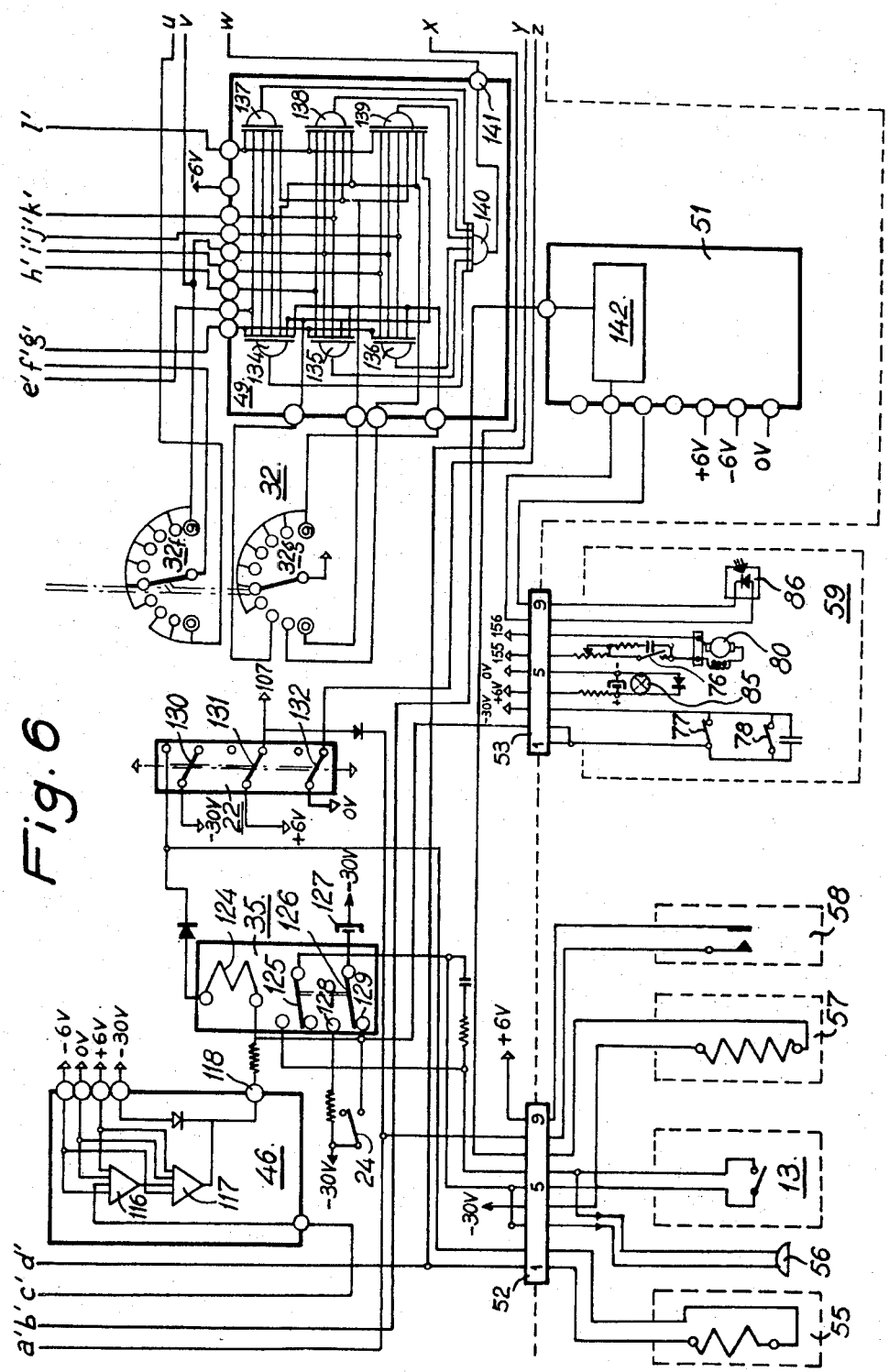

As shown also in FIG. 6, the cable feed and cable run measuring unit 59 utilizes eight terminals of connector 53, of which two are used to connect the two parallel-connected microswitches 77 and 78 between terminal 129 of relay 35 and the −30 V potential, two provide a 6 V supply to the lamp of light source 85 with an intensity stabilizing Zener diode in parallel, two others supply the motor 80 through series-connected microswitch 76 off two terminals 155 and 156 of strip 100, and the last two are used to connect reading cell 86 to two terminals of module 51, one of which controls trigger circuit 142.

Connector 54 permits of connecting to the alternating current mains supply 154 the two terminals 155 and 156 of strip 100, one of them via the fuse 30 and the switch 28 which closes the circuit when it is in the "On" position. Strip 100 merely comprises a conventional transformer circuit which steps down the 115 V supply obtained at terminals 155 and 156 to voltages of 6 V, −6 V and −30 V, plus the output lines for the decades zeroing means 101 and the main zeroing means 107.

It should be noted finally that cable cutting microswitch 58 is open when the guillotine is inoperative and closes when the knife operates.

The procedure for operating the system hereinbefore described, for the purpose of producing a series of, say, 10 4-meter long cable sections, is as follows:

In an initial preparatory stage, place "On-Off" switch 28 in the "On" position, open the pneumatic circuit of jacks 15 and 91, place the "First cable test/Automatic" changeover switch 22 in the "First cable test" position, adjust the marking machine's marker-holder to the correct temperature and start the motor running. Next, set the marker to the required mark and mount it on the marker-holder, set the "Number of cables" knob 21 to "10", the "Decameters" knob 25 to "0", the "Meters" knob 26 to "4" and the "Decimeters" knob 27 to "0", then fit a cable reel 9 onto its support. Raise the pulleys 60 and 61 by rotating the lifting knob 67 through a quarter turn, the effect of this being to shut off the feed motor 80 via microswitches 77 and 78.

Grasp the end of the cable, engage it through cable-guide 65, then through the stick rings 73 and cable-guide 66, lower the pulleys by means of knob 67, then pull the end of the cable until it is level with the guillotine knife 91. Because the feed motor 80 is energized, this operation is facilitated, the reason for which may be explained as follows: as shown in FIG. 7, in the case of the nine first sections, the first marking point 97 may be, say, 0.30 m distant from the cutting point; this makes it necessary to secure an 0.30 m lead of marked cable (not accounted for by the length counter 37–42) and to stop the marking at 98a at a point 0.30 m before the cutting point 97a when producing the tenth and last section, as shown in FIG. 8. This operation is indispensable in order not to be penalized with an additional marked length of 0.30 m at the end of each cutting sequence on a batch bearing a given mark, this length being lost because it adjoins the next mark-free cable; another risk is that a given cable section could bear two different identification marks.

Next, feed the marking machine, that is to say engage the cable through cable-guide 16, then operate one-shot pedal 13 to make the first marking. Check the quality of the marking and the correctness of its composition, making possible adjustments to the pressure or temperature of the marker. If all is correct, operate the pedal once more to obtain a sufficient length of printed cable for passage through the machine drive 19–20, then through the guillotine cable-guide 93. Then set the "First cable test/Automatic" changeover switch 22 on "Automatic" and thereafter the system will begin to function in the fully automatic servoed mode.

The effect of switching to "Automatic" is to firstly cut out the No. 1 position setting of stepwise selector 36 and secondly to cut out the main zeroing means 107, thereby causing the zeroed decade-units 37 through 42 to be latched no longer and to become capable of counting. This also permits switching of bistable multivibrator 105 of module 45 (which was placed in a specific state when the zeroing bias was applied) and activation of relay 35. It should be noted that the switch to the operative position of relay 35 via amplifier 117 of module 46 is dependent on a check by gate 103 that the decade-units are in the 0 state. As relay 35 strips in it shunts pedal circuit 13 and the marking machine begins to operate.

The centimetric signals supplied by transducer photodiode 86 are amplified and shaped by trigger circuit 142 of module 51, then applied to the input 43 of the first decade-unit 37 which effects a division by ten and in turn drives the decimeters decade-unit 38 which, for every ten pulses on its input, sends out one impulse to the input of the meters decade-unit 40, which operates in the same way in respect of decameters decade-unit 42, thereby providing a binary counter. The binary data supplied to each decade of the counter are decoded and converted into decimal data by converters 39, 41 and 43, the conversion being such that, for the chosen exemplary length of 4 m, i.e. for 400 centimetric pulses applied to the counter input, only the "0" output of "Decimeters" binary-decimal converter 39, the "4" output of "Meters" binary-decimal converter 41 and the "o" output of "Decameters" binary-decimal converter 43 will be at a strong negative potential (−6 V : state 1), all the remaining outputs of the converters being at a low negative potential (0 V : state 0). It is by virtue of selection of these states at the chosen levels by the decimeter, meter and decameter setting switches 31, 32 and 33 respectively that the data pulses for assuring the functional sequences of the system are picked up.

The first sequence is the one ending up in the switch to "coarse pitch". Bistable multivibrator 150, which is placed in a determinate state when the zeroing bias is applied, is allowed to switch, this bias being cut off after the switch to "Automatic". The arrangement is such that when the zeroing bias is applied to 150, the pitch change jack is activated at "fine pitch" via its electrically operated valve 57 and amplifier 153 of module 50. A "0" bias is applied to negative gates 145 and 146 of module 48 via switching surface 33c of 33, the cursor of which is on "0" and via the switching surface 32f of 32 the cursor of which is on "4". These gates are disabled and only gate 144 of module 48 can cause switching of multivibrator 150 and hence the change to "Coarse pitch" via positive gate 147, signal regenerating amplifier 148, and switch 23. Now the information for controlling gate 144 is taken from output 1 of the "Meters" decade-unit converter 41, so that only at the tenth decimetric pulse will this output be at a strong negative potential to cause multivibrator 150 to switch for the change to coarse pitch.

Generally speaking, selection of one or the other of gates 144, 145 or 146, which depends on the positions of setting selectors 31, 32 and 33, will enable switches to coarse pitch to take place between the following length limits:

0 m to 2.90 m — fine pitch only
3 m to 9.90 m — switch to coarse pitch at 1 m
10 m to 19.90 m — switch to coarse pitch at 2 m
20 m to 99.90 m — switch to coarse pitch at 3 m The second sequence is the one ending up with a return to fine pitch. A "0" bias is applied to negative gates 135, 136, 138 and 139 of module 49 by switching surface 33c of 33, the cursor of which is on "0" and switching surface 32f of 32, the cursor of which is on "4". A "0 " bias is also applied to negative gate 134 by 32g of 32, the cursor of which is on "4". Hence only negative gate 137 is able to transmit a revert-to-fine-pitch command to multivibrator 150 via amplifier 149 and positive gate 140. In the example considered herein, the command for reverting to fine pitch is picked off via switching surface 32b of 32, but because this switching surface is wired with a one-position stagger and all the cursors of 32 are positioned on "4", the return to fine pitch will be commanded only at the thirtieth decimetric pulse.

More generally, and by reason of the staggered wiring of switching surfaces 32c and 32d, it is the information picked off one of the three cursors of switching surfaces 32b, 32c or 32d, selection of which is effected by the negative gates 134 through 139 as commanded by the length-combination setting, that causes the return to fine pitch in accordance with the following law :

0.30 m to 2.90 m — fine pitch only 3 m to 9.90 m — return to fine pitch at 1 m + number of decimeters set up 10 m to 19.90 m — return to fine pitch at 2 m + number of decimeters set up 20 m to 99.90 m — return to fine pitch at 3 m + number of decimeters set up The third sequence is the one which ends with cutting of the cable. The command to cut is picked off via the cursors of switching surfaces 31a, 32a and 33a, which are respectively on 37 0", "4" and "0"; it will consequently be at the fortieth decimetric pulse that the three inputs of negative gate 109 of module 44 will all be at strong negative potential to satisfy the condition for actuating knife 90 via control amplifier 111 of electrically-operated valve 55 and the pneumatic jack; in addition, the moving core of stepwise selector 36 moves into its operative position. As soon as mechanical action of the knife is initiated, the machine's drive 19 is released. Knife 91 is driven downwards by the jack, cuts the cable, and as it reaches the bottom of its travel operates the microswitch 58 thereby to close its working contacts and to bias at +6 V the zeroing line 101 of the decade-units while at the same time confirming that multivibrator 150 is in a state to command "-Fine pitch".

The zeroed state of the decade units is verified by gate 103 of module 45; if it is correct, relay 35 remains in its operative position. Negative gate 109 ceases to drive the guillotine amplifier 111, the moving core of stepwise selector 36 drops back and its cursors advance by one step to account for the cable length just processed. Simultaneously, the guillotine knife rises, the machine drive is restored and the cycle recommences to process the next cable in accordance with the procedure hereinbefore described.

The next stage is the processing of the last cable with the marking stopping 0.30 m short of the preset length. The stepwise selector advances by one step each time the knife operates, whereby after nine cable processings the cursor on the bank of contacts 36b will be in position "10". But since the number of cables to be processed is also equal to 10 the cursor of selector 34 will also be on "10". At this stage, therefore, coincidence will occur and the −6 V potential will be applied to negative gates 120, 121 and 122 of module 47 in order to enable them to operate. Further, since the decimeters setter 31 is on "0", the cursor of switching surface 31c will send a "0" bias to gate 120 in order to disable it, and since the cursor of the meters switching surface 32e is on "4", a "0 " bias will also disable gate 122, so that only gate 121 will remain capable of transmitting a command. The command data for this gate are picked off firstly via the cursor of decimeters switching surface 31b and secondly via the cursor of meters switching surface 32b, and because these switching surfaces are wired with a stagger of three and one positions, it will be possible to obtain 4 − 1 = 3 m and 0 − 3 = 7 dm. Thus the conditions required to command stoppage of the marking 0.30 m short of the end of the last cable through the release of relay 35 via the channel formed by gates 121-119 of module 47 and amplifier 113 of module 44, through switching of bistable multivibrator 105 of module 45 and through control amplifier 117 of module 46, are met at the thirty-seventh decimetric pulse.

A stoppage in the marking of the last cable 0.30 m short of the preset length is thus obtained automatically through selection of one of negative gates 120, 121 or 122, which selection is effected on the basis of the length combination preset on selectors 31, 32 and 33.

The ultimate phase consists in cutting of the last cable and stopping for the end of the batch. The marking machine stops, with relay 35 dropped out. A pull is then exerted on the cable from the side of the guillotine cable-guide exit tube 96, and at the thirtieth centimetric pulse the knife drops by the procedure described precedingly, and the same applies to stepwise selector 36 which advances by one contact stud. The contact stud 11 of bank of contacts 36c will then be in electrical registry with stud "10" of contact surface 34a and consequently a "0" bias will be applied to the input of bistable multivibrator 150 to lock relay 35 in its released position. This completes the batch of cables, and only by setting changeover switch 22 on the "First cable test" position is it possible to set the various sequences in the starting configuration ready to process a fresh batch of cables.

What I claim is :

1. In an automatic servo system for an electric cable marking machine of the kind comprising cable drive means, marking means, cutting means, controls for these means and control means for changing the pitch of the marking by varying the relative rates of said drive means and marking means, in combination, cable-run measuring means positioned upstream of the marking machine, cable cutting means positioned downstream thereof, electronic means for generating signals for controlling the marking, changes of pitch therein and cutting of said cable in marked cable sections, said electronic means being operatively controlled by said cable-run measuring means and comprising series-connected decade-units for inparallel control of binary-decimal converters the outputs of which are electrically connected to selectors cursors the positions of which represent a presetting of the length to be imparted to each cable section, means for automatically activating means for shunting cable transfer means on said marking machine, means for activating the pitch change control means after a predetermined length of cable run and means for releasing the same after a further predetermined length of cable section run short of the full preset cable length, said activating means and release means being rendered operative via those selector contact studs which correspond to the preset lengths, means for actuating said cable cutting means rendered operative via the several selector cursors when the measured length reaches the preset length, and means for zeroing said decade-units responsively to operation of said cutting means.

2. A system as claimed in claim 1, wherein the cutting means is operatively connected, during its cable cutting motion, to means for releasing said cable transfer means of said marking machine.

3. A system as claimed in claim 1, wherein the cable feed means include two tangential pulleys one of which is driven by an electric motor through a torque limiter.

4. A system as claimed in claim 3, wherein a cable guiding stick is disposed between cable feed means and cable run measuring means, said stick being pivotally mounted with a resting position normal to the line joining the aforesaid means and having its pivoting axle supporting two cams which are adapted to so actuate two contact switches as to start and stop said electric motor when said stick is inclined at 30° and 75° respectively to its resting position.

5. A system as claimed in claim 1, wherein the means for activating the pitch change control means are energized through an electronic trigger circuit the switching into enabling state of which is controlled via a set of parallelled negative electronic gates the inputs of which are controlled both via various of said contact studs of said selectors that correspond to different preset pitch-change lengths and via various converter outputs corresponding to different preset cable length intervals for which said different pitch-change lengths must be used.

6. A system as claimed in claim 5, wherein a pitch change override switch is connected into the circuit for energizing the enabling state of the electronic trigger circuit.

7. A system as claimed in claim 1, wherein a stepwise selector has its movements controlled from the selector cursors as a whole when the measured cable length reaches the preset length and is connected to a further selector the position of the cursor of which corresponds to a presetting of the number of cables to be marked and cut automatically in a sequential batch, said system further including a stop relay which is actuatable to cut out the shunt on the means for actuating the cable transfer means of the marking machine via a further electronic trigger circuit the switching of which into the enabling state is controlled via a further set of parallelled negative electronic gates the inputs of which are controlled at once from the cursors of the cable length setting selectors, from various other contact studs of said selectors corresponding to the preset length for return of the pitch change and from the cursor of said further selector.

* * * * *